May 21, 1940.  W. SPRINGER  2,201,305

FISHING LINE REEL

Filed May 10, 1937

Inventor:
W. Springer

By: Glascock Downing & Seebold
Attys.

Patented May 21, 1940

2,201,305

UNITED STATES PATENT OFFICE 2,201,305

FISHING LINE REEL

Wilhelm Springer, Isny, Germany

Application May 10, 1937, Serial No. 141,785
In Germany April 8, 1937

3 Claims. (Cl. 242—84.1)

This invention relates to a fishing line reel and a box or casing for housing this reel. According to the invention the reel consists of two portions in the form of disks which can be pushed into each other, each disk having an outwardly protruding flange. The mutually contacting faces of the flanges are preferably made slightly conical. The reel is thus formed by fitting these flanged disks together. Before assembly, a coil of fishing line is pushed over the annular portion which lies outside when the disks are fitted together. After use, the disk portions can be taken apart, the fishing line removed from the reel and hung up to dry.

Heretofore fishing lines have been sold wound on reels, mounted on cards or wound in coils or rings. As compared with lines mounted on reels or cards, those wound in coils and mounted on a divided reel have the advantage that the line can be examined more carefully. With fishing lines in coil form there was hitherto the drawback that, in winding on the line from the reel portion lying horizontally, it was pulled upwards whilst being drawn off and thereby easily twisted. In order to avoid the line thus becoming twisted, the angler was obliged to resort to the inconvenient procedure of first making a sleeve of cardboard etc., slipping the coil on this sleeve and then winding the coil off this sleeve. Due to the divisibility of the spool according to the invention it now becomes possible to mount the coil of fishing line on the reel in an exceedingly simple manner.

It should be mentioned that coils of fishing line can be manufactured more cheaply than those mounted on reels, spools and cards as known hitherto.

By means of the reel it is then easily possible to rewind the line on to the reel mounted on the fishing rod whilst conversely, after use, it can be wound back again on to the divided reel. It can then be removed from the latter and dried, as already stated.

In order to ensure a satisfactory bearing for the reel during re-winding, one of the reel portions has a hub portion shaped as a guide sleeve through which a mandrel can be passed.

Further, one of the reel portions can be provided with engagement openings for the insertion of the finger or an object, such as a piece of wood, to facilitate the turning of the reel during winding. Also the outer portions of the disks of the reel are preferably provided with apertures in order to facilitate the access of air to the ring of fishing line, which may be wet, for example.

This divided reel according to the invention may be arranged inside a box or casing, the bottom portion of which is provided with a mandrel adapted to fit into the sleeve-shaped hub of the reel. Thus the reel can easily turn in the bottom portion of the box and the line can easily be wound on and off. Furthermore, in its circumferential casing the bottom portion is provided with an aperture which corresponds with an aperture in the cover or lid of the box so that by turning the cover with respect to the bottom portion, the aperture can be exposed or covered. In order to fix the position of the lid with respect to the bottom of the box, in both positions, one of the box portions can be provided with a projection which is adapted to fit into one of two cavities of the other portion, their shape corresponding with that of the projection.

By way of example the drawing shows an embodiment of the object of the invention.

Figs. 1 and 2 give cross-sections of the respective reel portions which can be pushed into each other.

Figure 5:
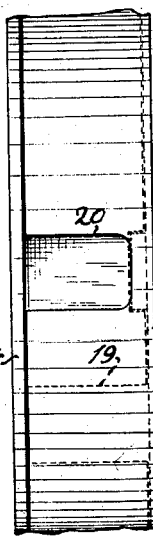
Figure 6:
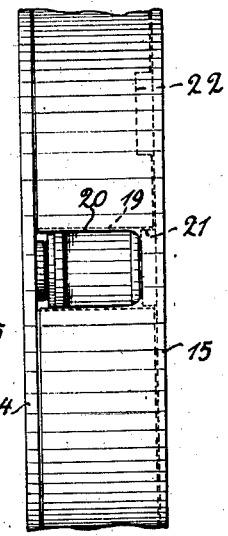

Figs. 5 and 6 give a side elevation on the box, with the air access opening closed and opened respectively.

The two reel portions comprise disks 1 and 2 which are provided with flanges 3 and 4 so proportioned that they can be pushed into each other and then fit tightly in each other owing to the conical shaping of the inner face of the flange 3 of the disk 1 and the outer face of the flange 4 of the disk 2.

The two disks 1 and 2 are provided in their outer portions 5 and 6 with apertures 7, 8 to allow the air to pass through. At the inner portion, the disk 1 is closed as at 9 whilst the corresponding portion 10 of the disk 2 is provided with apertures 11 in which a finger or a piece of wood or the like may be inserted for turning the reel.

Figure 1:
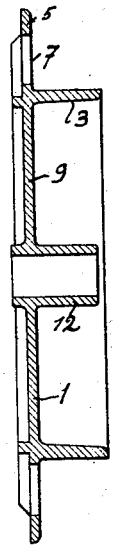
Figure 2:
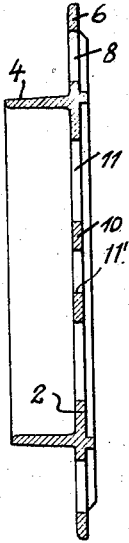
Figure 3:
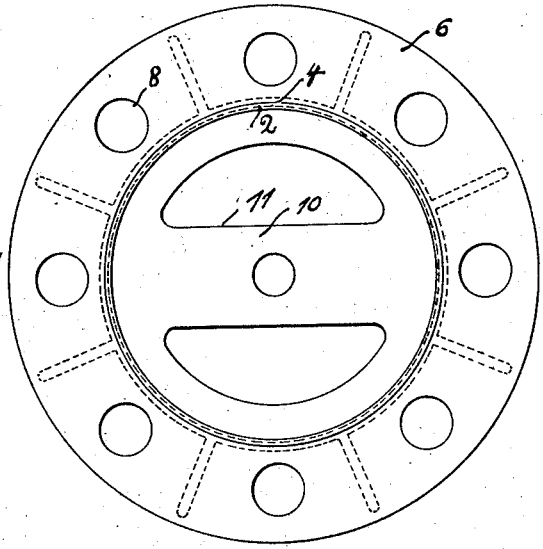
Fig. 3 shows a face view of the reel portion indicated in Fig. 2.
Figure 4:
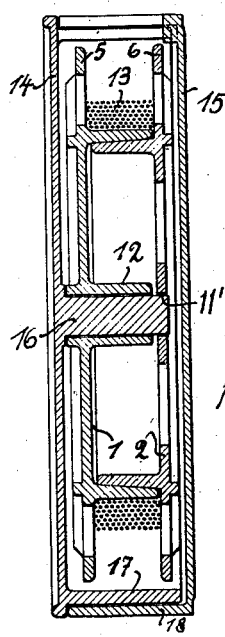
Fig. 4 illustrates the assembled reel formed by pushing the parts shown in Figs. 1 and 2 into each other and also shows the coil of fishing line mounted on the reel as well as the appertinent case or box, everything being in cross-section.

In the center of the portion 9 of the disk 1 a sleeve portion 12 is formed in the shape of a hub and a suitable mandrel can be inserted into this when the reel is to be used for winding the fishing line on or off. As already mentioned, the coil of fishing line 13 is mounted before reel portion 2 is pushed into the reel portion 1, and is removed again after first taking these two portions apart. As illustrated in Fig. 4, the reel may be enclosed inside a box formed of a bottom portion 14 and a top portion 15. The base of the bottom portion 14 is furnished with a mandrel-shaped extension 16, on which the hub-shaped sleeve portion 12 of the reel is mounted. The outer end of this hub is also arranged in a central opening 11' in the disk 2. The annular casing portions 17 and 18 respectively of the bottom and top halves of the box are furnished with apertures 19 and 20 which, by turning the top with respect to the bottom, can be made to pass into registry with each other (Fig. 6) or out of registry (Fig. 5).

Over the aperture, the top half of the box is provided with an extension or projection 21 which either engages in the aperture 19 of the bottom half of the box, that is, when the two apertures 19 and 20 are registering with each other, or in a slot 22 adapted to the shape of the projection 21, that is, when the apertures 19 and 20 have been brought out of registry with each other, as Fig. 5 indicates.

Having thus described my said invention, what I claim as new therein and desire to secure by Letters Patent is:

1. A fishing line reel for use in a fishing assembly including a pair of spaced disk members, an annular cone shaped flange integral with each of said disk members, said flanges interfitting one within the other one of them and forming a seat for a coil of fishing line, a hub formed at the center of one of said disk members and extending toward the other disk member and acting as a means to facilitate the rotatable mounting of the disk, the other disk member having an aperture in its center and coaxial with the hub, said disk members having a series of apertures to provide ventilation for a fishing line, and one of said disk members having another series of apertures to facilitate the rotation of the reel.

2. In a fishing line assembly the combination with a reel including spaced disks, interengaging flanges on said disks forming a closed seat for a coil of fishing line between the disks to permit the reel being used independently if desired and a central hub on one of said disks of a casing for receiving the reel composed of two parts having interengaging peripheral flanges, a mandrel on one of the parts for receiving the hub of the reel, said peripheral flanges provided with registrable apertures adapted to register on relative rotation of the two casing parts so that when in an open position a fishing line may be passed therethrough for transfer purposes, and said peripheral flanges provided with interengaging means so as to releasably hold the apertures in registration.

3. In a fishing line assembly the combination with a reel including spaced disks, interengaging flanges on said disks forming a closed seat for a coil of fishing line between the disks to permit the reel being used independently if desired and a central hub on one of said disks of a casing for receiving the reel composed of two parts having interengaging peripheral flanges, a mandrel on one of the parts for receiving the hub of the reel, said peripheral flanges provided with registrable apertures adapted to register on relative rotation of the two casing parts so that when in an open position a fishing line may be passed therethrough for transfer purposes, the inner peripheral flange having a notch therein, and a projection on the outer peripheral flange for engaging either the notch or the aperture in the inner flange to selectively hold said apertures in a closed or open position respectively.

WILHELM SPRINGER.